United States Patent

Stingl

[11] 4,173,565
[45] Nov. 6, 1979

[54] RUBINE DISAZO ACID DYES FOR POLYAMIDES

[75] Inventor: Hans A. Stingl, Toms River, N.J.

[73] Assignee: Toms River Chemical Corporation, Toms River, N.J.

[21] Appl. No.: 864,034

[22] Filed: Dec. 23, 1977

[51] Int. Cl.$^2$ ............... C09B 31/04; C09B 31/06; C09B 31/08
[52] U.S. Cl. .................. 260/191; 260/177; 260/184; 260/185; 260/187; 260/189; 260/190; 8/41 B
[58] Field of Search ............... 260/174, 177, 184, 185, 260/187, 189, 190, 191

[56] References Cited

U.S. PATENT DOCUMENTS 3,823,131  7/1974  Stingl .................. 260/184

FOREIGN PATENT DOCUMENTS

| | | | |
|---|---|---|---|
| 2006261 | 8/1971 | Fed. Rep. of Germany | 260/191 |
| 2628470 | 1/1977 | Fed. Rep. of Germany | 260/191 |
| 48-15228 | 12/1973 | Japan | 260/191 |
| 1322704 | 7/1973 | United Kingdom | 260/191 |
| 1445726 | 8/1976 | United Kingdom | 260/191 |

OTHER PUBLICATIONS

*Colour Index*, vol. 4, 1971, p. 4228, C.I. 26200.
Crompton et al., "Derwent-Netherlands Patents", No. 08569x/05 (1974).
ICI, "Derwent-Belgian Patents", No. 22489w/14, (1975).

*Primary Examiner*—Winston A. Douglas
*Assistant Examiner*—John Doll
*Attorney, Agent, or Firm*—Edward McC. Roberts

[57] ABSTRACT

Dyes of the formula

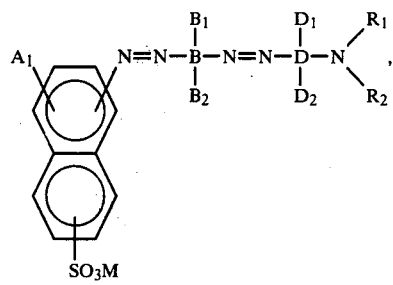

wherein B and D are each independently 1,4-phenylene or 1,4-naphthylene;
 M is hydrogen, lithium, sodium, potassium or ammonium;
 $A_1$ is hydrogen, $C_{1-4}$ alkoxy, $C_{1-4}$ alkyl, trifluoromethyl, nitro, chloro, bromo, cyano, or hydroxy;
 $B_1$ and $B_2$ are each hydrogen, $C_{1-3}$ alkoxy, $C_{1-3}$ alkyl, chloro or bromo;
 $D_1$ is hydrogen, $C_{1-4}$ alkoxy, $C_{1-4}$ alkyl, or chloro;
 $D_2$ is hydrogen, $C_{1-4}$ alkoxy, $C_{1-4}$ alkyl, chloro, bromo, fluoro, or acylamino, acyl being $C_{1-5}$ alkanoyl, $C_{1-5}$ alkylsulfonyl, benzoyl or benzenesulfonyl, each acyl unsubstituted or substituted with 1 to 3 of $C_{1-2}$ alkyl, $C_{1-2}$ alkoxy, chloro, bromo, cyano, or hydroxy; and
 $R_1$ and $R_2$ are each $C_{1-6}$ alkyl, $C_{1-6}$ chloro or bromoalkyl, $C_{2-6}$ hydroxy- or dihydroxyalkyl, $C_{2-6}$ alkoxyalkyl, $C_{1-6}$ cyanoalkyl, or phenyl-$C_{1-2}$ alkyl (phenyl unsubstituted or substituted with 1 to 3 of $C_{1-2}$ alkyl, $C_{1-2}$ alkoxy, chloro, bromo, cyano or hydroxy)
are useful in dyeing natural and synthetic polyamide fibers in deep and level shades of red to blue.

6 Claims, No Drawings

RUBINE DISAZO ACID DYES FOR POLYAMIDES

The instant invention is directed to water-soluble disazo dyes, and has an object the provision of dyestuffs particularly suited to the dyeing of natural and synthetic polyamide fibers such as silk, wool and, particularly, nylon. It is a further object of this invention to provide water-soluble dyes which have a strong affinity for polyamide fibers so as to readily exhaust thereon from neutral to weakly acidic aqueous dyebaths. It is a further object of this invention to provide dyes which color polyamide fibers, particularly nylon, in deep and level shades of red to blue, which show high fastness to light, washing, perspiration and dry cleaning. It is a further object of this invention to provide dyes, of equal or superior quality to art dyes derived from alpha-naphthylamine, which can be readily synthesized without the use of alpha-naphthylamine, the toxicity of which makes its use prohibitive in the dye industry.

These and other objects of this invention have been realized by the provision of dyes of the formula:

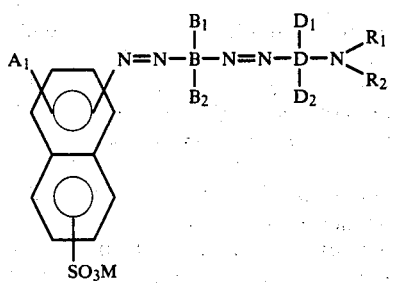

wherein B and D are each independently 1,4-phenylene or 1,4-naphthylene;

M is hydrogen, lithium, sodium, potassium or ammonium;

$A_1$ is hydrogen, $C_{1-4}$ alkoxy, $C_{1-4}$ alkyl, trifluoromethyl, nitro, chloro, bromo, cyano, or hydroxy;

$B_1$ and $B_2$ are each hydrogen, $C_{1-3}$ alkoxy, $C_{1-3}$ alkyl, chloro or bromo;

$D_1$ is hydrogen, $C_{1-4}$ alkoxy, $C_{1-4}$ alkyl, or chloro;

$D_2$ is hydrogen, $C_{1-4}$ alkoxy, $C_{1-4}$ alkyl, chloro, bromo, fluoro, or acylamino, acyl being $C_{1-5}$ alkanoyl, $C_{1-5}$ alkylsulfonyl, benzoyl or benzenesulfonyl, each acyl unsubstituted or substituted with 1 to 3 of $C_{1-2}$ alkyl, $C_{1-2}$ alkoxy, chloro, bromo, cyano, or hydroxy; and $R_1$ and $R_2$ are each $C_{1-6}$ chloro or bromoalkyl, $C_{2-6}$ hydroxy- or dihydroxyalkyl, $C_{2-6}$ alkoxyalkyl, $C_{1-6}$ cyanoalkyl, or phenyl-$C_{1-2}$ alkyl (phenyl unsubstituted or substituted with 1 to 3 of $C_{1-2}$ alkyl, $C_{1-2}$ alkoxy, chloro, bromo, cyano, or hydroxy).

Ammonium, in the above formula means the —NH$_4$ group or lower alkyl or hydroxy lower alkyl or hydroxy lower alkoxy alkyl or lower alkoxy alkoxy alkyl substituted ammonium groups.

Of the dyestuffs disclosed above, preferred members are those where B and D are both 1,4-phenylene, and more particularly those of the structure:

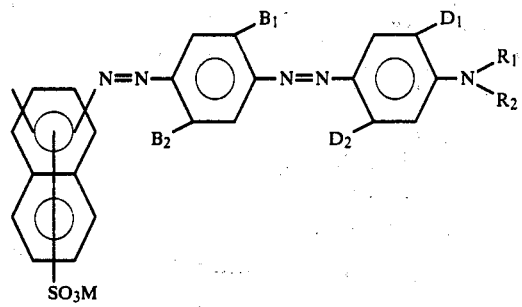

wherein $A_1$, $B_1$, $B_2$, $D_1$, $D_2$, $R_1$, $R_2$ and M are as defined above. Of these preferred dyestuffs a more preferred class includes those wherein $A_1$ is in the 2-position and is hydrogen, methyl, methoxy or ethoxy;

$B_1$ and $B_2$ are each hydrogen, methoxy, methyl or chloro, provided that only one of the $B_1$ and $B_2$ is methyl or chloro;

$D_1$ is hydrogen, methyl, methoxy or ethoxy;

$D_2$ is hydrogen, methyl, methoxy, chloro or acylamino, the last two members being less preferred;

$R_1$ and $R_2$ each are $C_{2-4}$ hydroxy- or dihydroxyalkyl, $C_{2-4}$ cyanoalkyl, $C_{2-4}$ alkoxyalkyl, $C_{1-4}$ alkyl or benzyl; and —SO$_3$M is attached to the 5,6 or 7-position of the naphthalene moiety.

The dyestuffs of this invention can be prepared by methods known in the art. For example, a monosulfonated naphthylamine of the formula

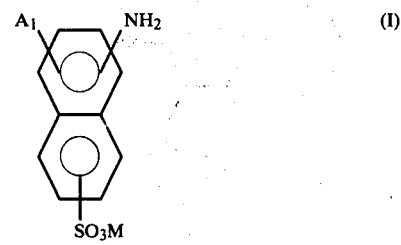

may be diazotized and coupled in the para-position to an appropriate aromatic amine HB-NH$_2$ (II), especially

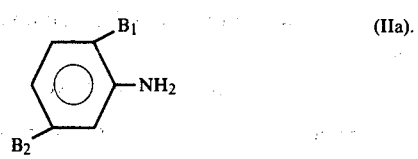

The amine II may suitably be coupled in the form of its N-methane sulfonic acid and the product thereafter saponified to obtain the desired substituted para-aminoazo compound

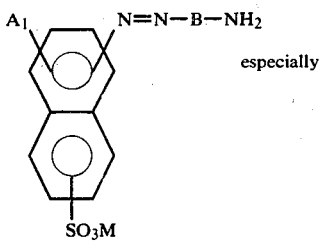
(III), especially

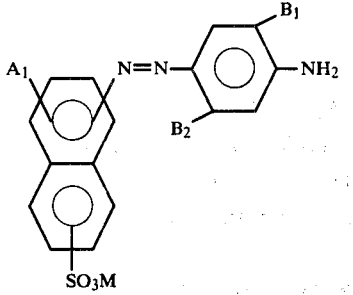
(IIIa).

This compound is then diazotized by known means and reacted with a coupler of the formula

(IV),

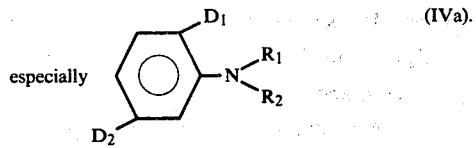
(IVa).

especially

Preferably, in carrying out the process for the preparation of the compounds of this invention, a sulfonaphthylamine of the formula

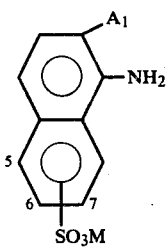
(Ib)

($A_1$ as described before for the more preferred class)

may be diazotized in an aqueous hydrochloric acid or sulfuric acid solution in a normal manner with sodium nitrite. Subsequently, an aniline compound of the formula

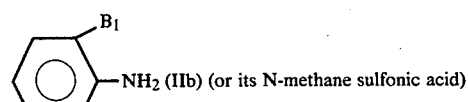
—$NH_2$ (IIb) (or its N-methane sulfonic acid)

($B_1$ and $B_2$ as described before for the more preferred class.)

and the above described diazotized sulfonaphthylamine compound are coupled under acidic conditions, usually buffered, e.g., with sodium acetate, to obtain a corresponding intermediate azo compound of the formula

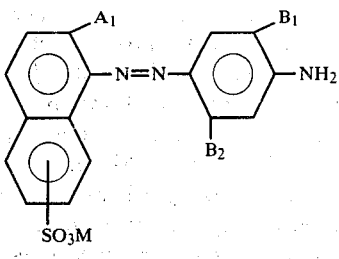
(IIIb).

This compound may then be appropriately diazotized and subsequently coupled with a coupler of the formula

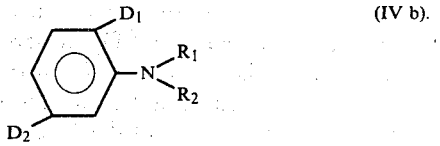
(IV b).

($D_1$, $D_2$, $R_1$, and $R_2$ as described before for the more preferred class)

Specific compounds of the formula I which may be mentioned are:

1-aminonaphthalene-3,4,5,6,7 and 8monosulfonic acids;
1-amino-2-methoxynaphthalene-6-sulfonic acid;
1-amino-2-ethoxynaphthalene-4,6 and 7-monosulfonic acids;
1-amino-4-chloro-, bromo or cyano-naphthalene-5,6 and 7-monosulfonic acids;
2-aminonaphthalene-1,4,5,6,7 and 8-monosulfonic acids;
2-amino-1-n-butoxynaphthalene-4- and 6-monosulfonic acids;
2-amino-5-hydroxy or methoxynaphthalene-7-sulfonic acid;
2-amino-8-hydroxy or ethoxynaphthalene-6-sulfonic acid.

Compounds of formula II which may be mentioned are:

1-aminonaphthalene, 2,5-dimethoxyaniline, 2,5-dipropoxyaniline, 2,5-diethoxyaniline, 2-ethyl-5-bromoaniline,
2-methoxy-5-methylaniline, 2- or 3-methylaniline, 2- or 3-ethylaniline, 2- or 3-chloroaniline, 2- or 3- methoxy or-ethoxyaniline, and aniline.

Compounds of formula IV which may be mentioned are:

N-cyanoethyl-N-ethylaniline, N-cyanoethyl-N-ethyl-m-toluidine, N-cyanoethyl-N-methylaniline, N-cyanoethyl-N-methyl-m-toluidine, N-cyanoethyl-N-butylaniline, N-hydroxyethyl-N-cyanoethylaniline, N-hydroxyethyl-N-cyanoethyl-m-toluidine, N-hydroxyethyl-N-ethylaniline, N-hydroxyethyl-N-ethyl-m-toluidine, N-hydroxyethyl-N-methylaniline, N-hydroxyethyl-N-butylaniline, N-2-hydroxypropyl-N-ethylaniline, N-2-hydroxypropyl-N-2-cyanoethylaniline, N,N-di-2-hydroxyethylaniline, N,N-di-2-hydroxyethyl-m-toluidine, N,N-di-2-hydroxethyl-m-chloraniline, N,N-di-2-hydroxyethyl-o-chloraniline, N,N-di-2-hydroxypropyl-o-toluidine, N,N-di-2-hydroxypropyl-m-toluidine, N,N-di-2-hydroxyethyl-o-anisidine, N,N-di-2-hydroxyethyl-m-ansidine, N-ethyl-N-chloroethylaniline, N,N-diethylaniline, N- ethyl-N-benzylaniline, N-ethyl-N-benzyl-m-toluidine, N-2-hydroxyethyl-N-benzylaniline, N-2-cyanoethyl-N-benzylaniline, N-ethyl-N-benzyl-o-anidine, N-benzyl-N-2-cyanoethyl-3-methoxyaniline, N-benzyl-N-2-hydroxybutyl-3-ethoxyaniline, N-p-methylbenzyl-N-propyl-2-ethylaniline, N,N-diethyl-3-chloroaniline, N,N-dipropyl-2-bromoaniline, N-m-ethoxybenzyl-N-butylaniline, N-m-chlorobenzyl-N-ethylaniline, n-p-methoxyethylbenzyl-N-ethylaniline, N-p-cyanobenzyl-N-ethylaniline, N,N-dibenzylaniline, N-ethyl-N-3-methoxypropylaniline, N-methyl-N-3-chloropropyl-aniline, N-propyl-N-2-bromoethylaniline, N-benzyl-N-2-methoxyethyl-m-toluidine, N,N-di-2-cyanoethylaniline, N-phenethyl-N-ethylaniline, and N-(p-methoxyphenethyl)-N-ethylaniline. m-N,N-Diethylaminoacetanilide, m-N,N-dimethylaminoisobutyranilide, m-N,N-diethylamino-propionanilide, m-N,N-di-2-hydroxyethylaminovaleranilide, m-N,N-dibenzylaminolactanilide, m-N-2-hydroxyethyl-N-ethylaminobenzanilide, m-N,N-diethylamino-p-methoxybenzanilide, m-N,N-diethylamino-o-cyanobenzanilide, m-N-2-hydroxyethyl-N-methylaminobenzenesulfanilide, m-N-2-chloroethyl-N-ethylaminotosylanilide, m-N-2-cyanoethyl-N-benzylaminoethylsulfanilide, m-N-2-cyanoethyl-N-ethylaminochloroacetanilide, m-N-ethyl-N-benzylaminoacetanilide, m-N,N-di-2-methoxyethylaminocyanoacetanilide, 3-N,N-diethylamino-4-acetanisidide, 3-N,N-di(hydroxyethyl)amino-4-acetphenetidide, 3-N-hydroxyethyl-N-ethylamino-4-chloro-propionanilide, 3-N-cyanoethyl-N-ethylamino-m-hydroxybenzenesulfonyl-4-toluidide, N,N-diethyl-2,5-dimethoxyaniline, N-ethyl-N-benzyl-2-methoxy-5-methylaniline and N-hydroxyethyl-N-cyanoethyl-2,5-diethoxyaniline.

The new dyes have generally good affinity, levelling and fastness properties on natural and synthetic polyamide fibers, which they dye from neutral or weakly acid dye baths in strong red to blue shades. Preferred are the dyes that are prepared without the use of the toxic alpha-naphthylamine or its derivatives because they are generally equal or superior in light fastness and other properties and do not need the special and expensive handling precautions mandatory for alpha-naphthylamine.

In comparison with known dyestuffs, such as those described in the U.S. Pat. No. 3,823,131, the present dyestuffs display a greater color intensity and have better exhaustion characteristics from neutral and alkaline dyebaths.

Illustrative examples of the manufacture and use of the inventive dyestuffs follow:

EXAMPLES

EXAMPLE 1

22.3 g of 1-Aminonaphthalene-6-sulfonic acid is diazotized in 300 ml of ice-water and 19 g of HCl, d=1.16 by rapid addition of a concentrated aqueous solution of 7 g sodium nitrite at 2°–5° C. and coupled below 7° C. by combining it with 13.7 g 2-methoxy-5-methyl-aniline, previously dissolved in 120 ml of water at 45° C. and 9.3 g of HCL, d=1.16, followed by the gradual addition of sufficient 25% aq. soda ash solution to establish a final pH of 4.0–4.5 for several hours. The monoazo compound formed can be isolated by filtration.

The monoazo compound is rediazotized in water, preferably as obtained, without isolation, after dissolving it at pH 10 with 15 g aq. 50% caustic soda, by the addition of 7.3 g sodium nitrite, as solution, followed by 47 g of HCL, d=1.16, and holding congo-acid for 1 hour at 3°–5° C. It is subsequently combined below 10° C. with 16 g N-2-hydroxyethyl-N-ethylaniline (preferably dissolved in 16 g glacial acetic acid) followed by the gradual addition of sufficient 25% aq. soda ash solution to establish a final pH of 5.0–5.5 at 10°–15° C. for several hours in order to produce the disazo dyestuff, which is isolated by filtration. It can be purified by reslurrying it in warm aq. 3% sodium chloride solution followed again by filtration.

The compound is easily water-soluble, has the structure

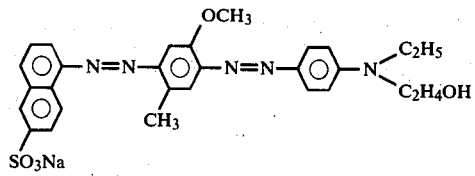

and dyes nylon from neutral or weakly acid dyebaths in level rubine shades of good light and wash fastness.

EXAMPLES 2–37

Using the procedures of Example 1, but replacing the aromatic amino compounds given in that procedure by other appropriate aromatic amino compounds in equivalent quantities, one obtains dyestuffs of the following structures (given in the acid form):

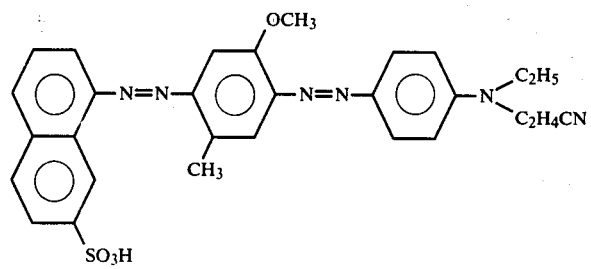

2.

-continued
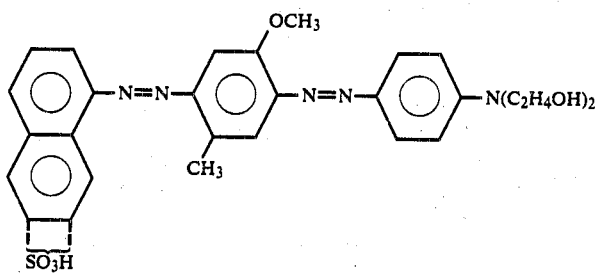
3.
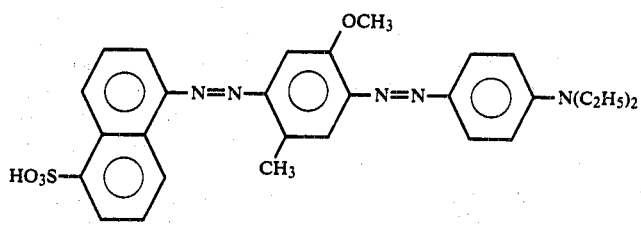
4.
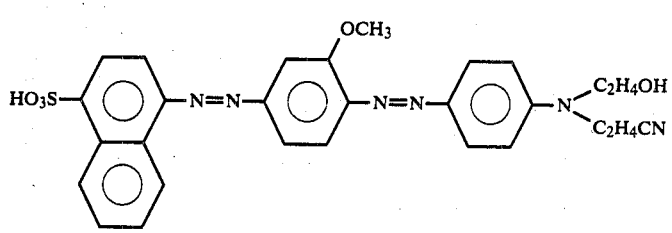
5.
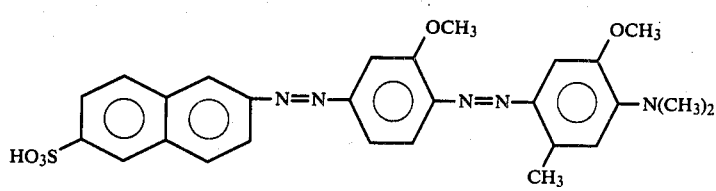
6.
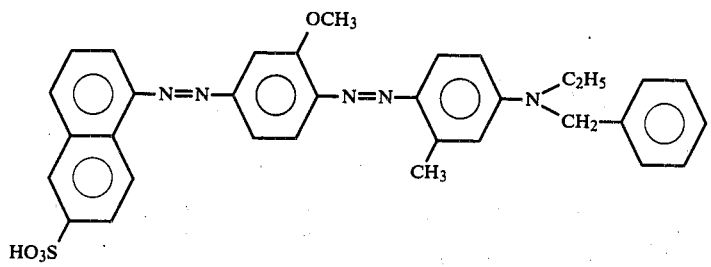
7.
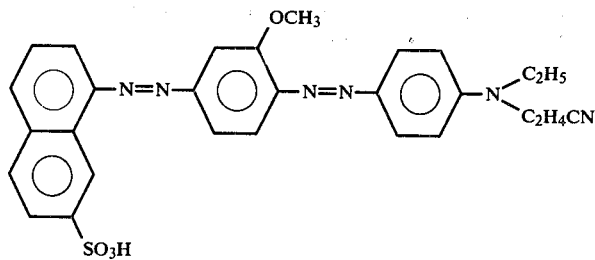
8.
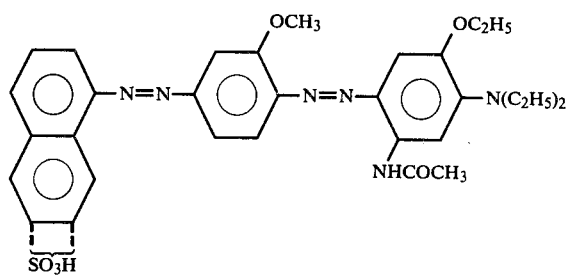
9.

-continued
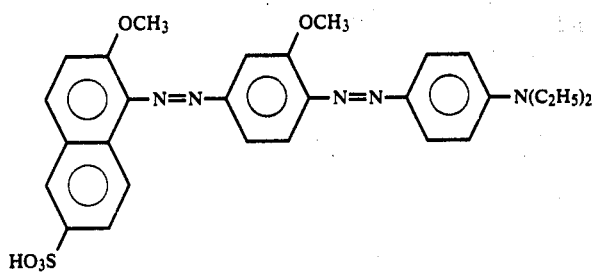
10.
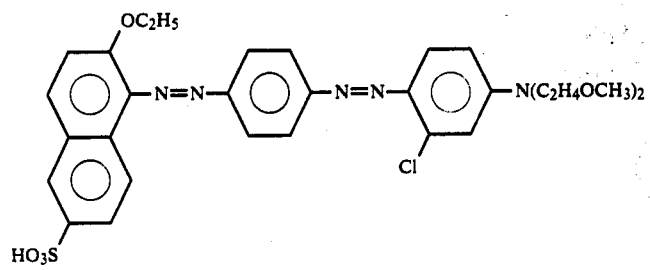
11.
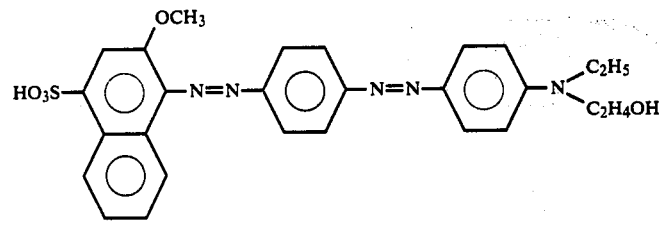
12.
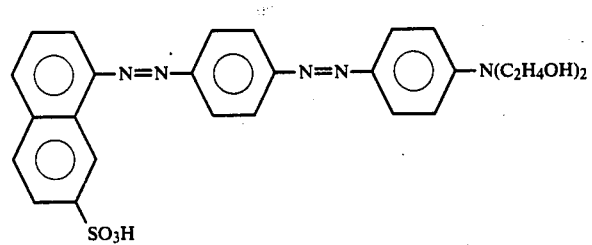
13.
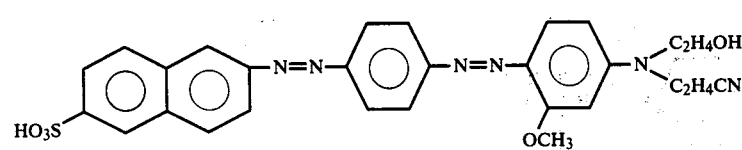
14.
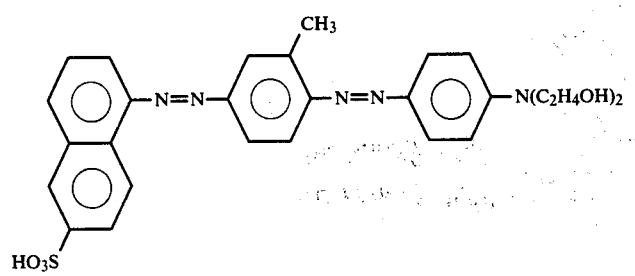
15.
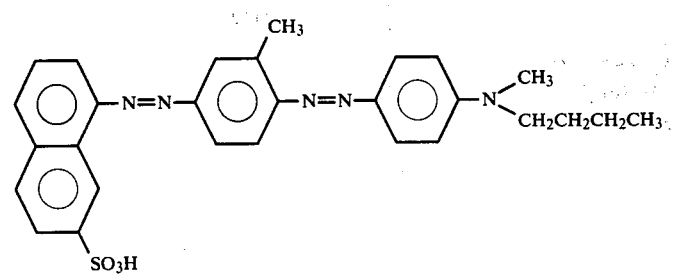
16.

-continued
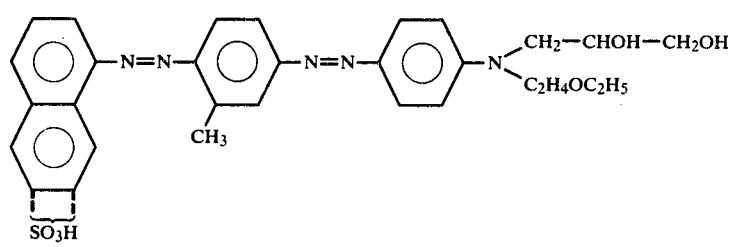
17.
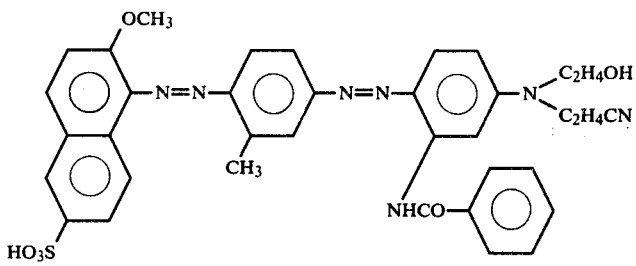
18.
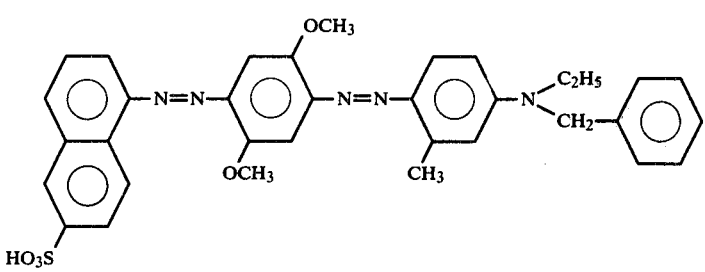
19.
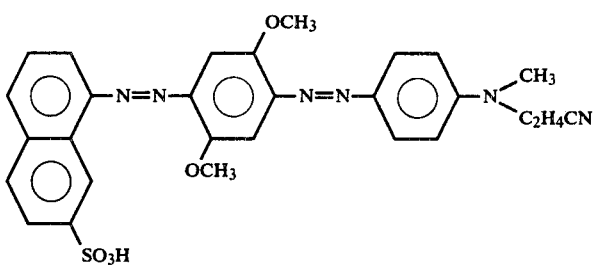
20.
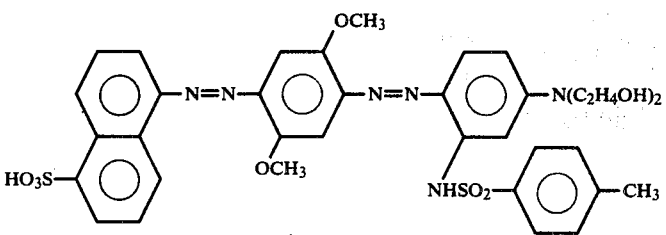
21.
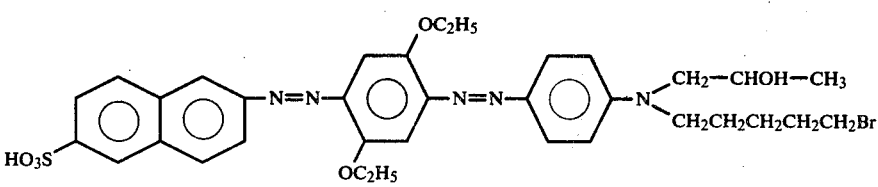
22.
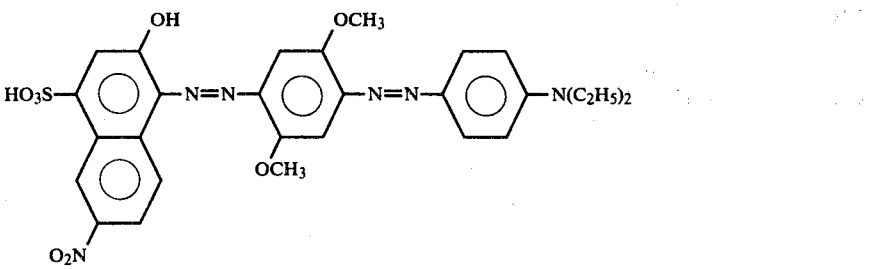
23.

-continued
24.
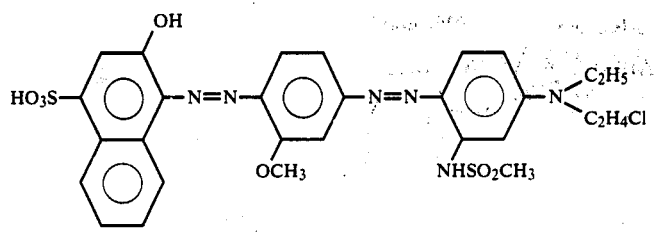
25.
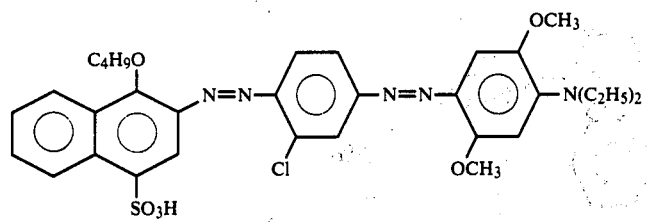
26.
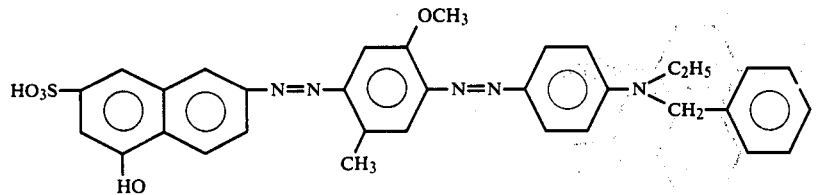
27.
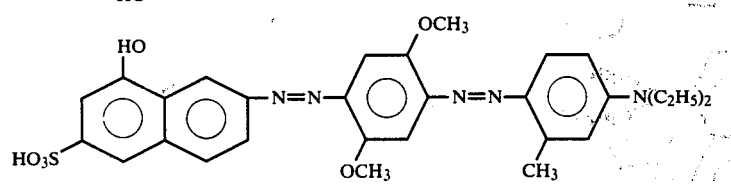
28.
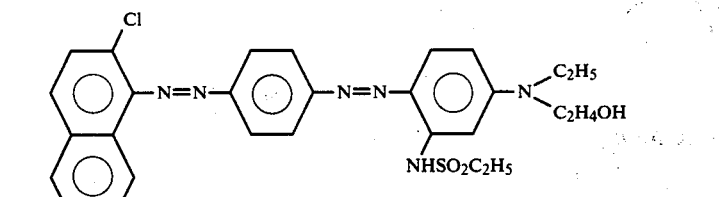
29.
30.
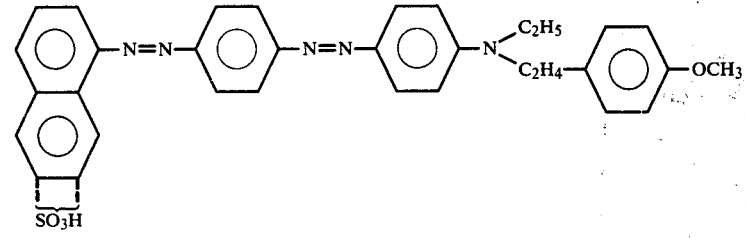
31.
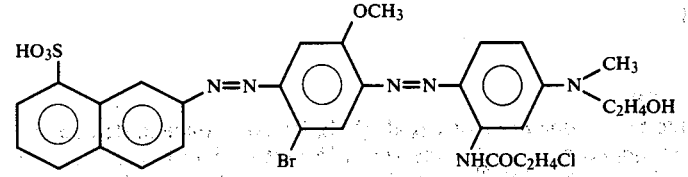
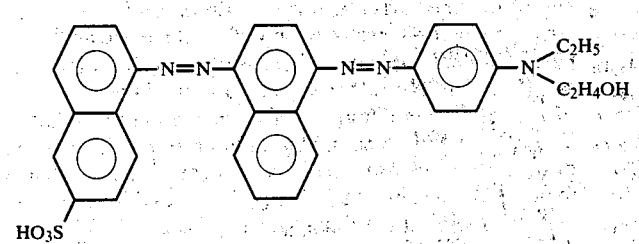

32. 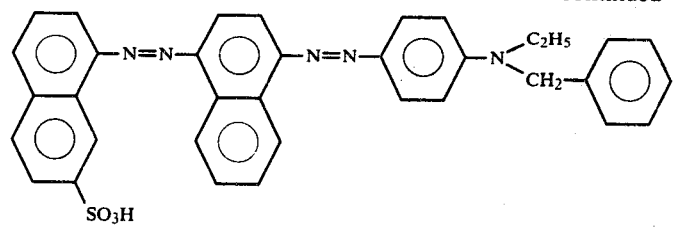

33. 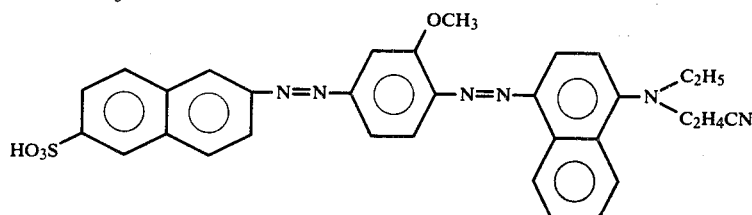

34. 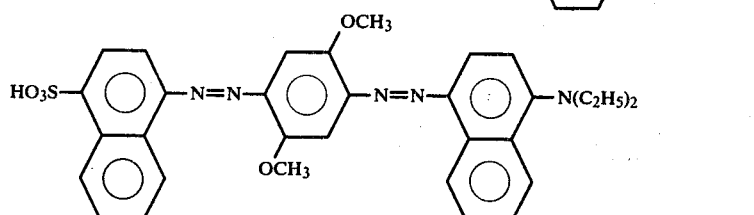

35. 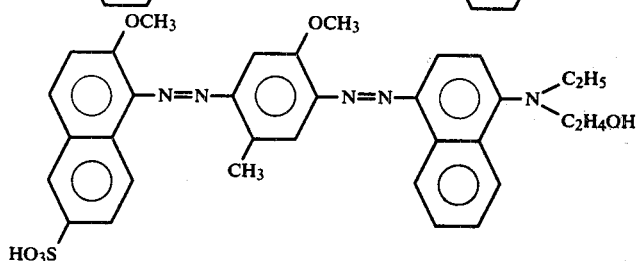

36. 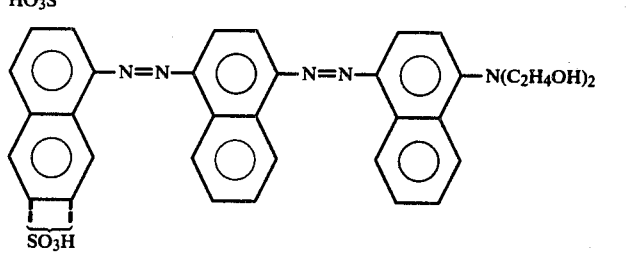

37. 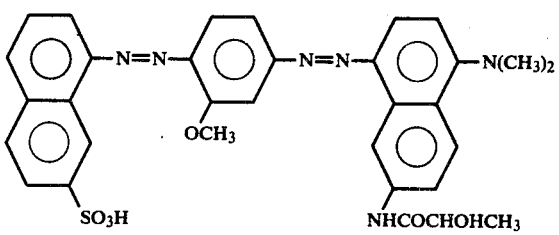

EXAMPLE 38

Dyeing nylon carpeting—The carpeting is made by tufting nylon yarn onto a jute backing. The BCF nylon yarn used for this is 3700-denier, 204-continuous filaments, trilobal, jet-bulked yarn, melt-spun from poly(hexamethylene adipamide) flake. The yarn is jet-bulked with the jet taught by Hallden et al. in U.S. Pat. No. 3,005,251.

Thirty parts of said carpeting are installed in dye-bath equipment. First it is helpful to scour the carpet at 180° F. (82° C.) for 20–30 minutes in a bath made up of 1000 parts water, 0.2 part of a nonionic surfactant (the condensation product of 20 moles of ethylene oxide with one mole of $C_{18}$ alcohol), 0.6 part concentrated ammonium hydroxide and 0.15 part sodium hydroxide. The bath is dropped and the carpet is rinsed with clean water. A dyebath is then made up of 1000 parts water, 0.3 part of dodecyldiphenyl ether disulfonic acid, disodium salt (U.S. Pat. No. 2,081,876), 0.03 part of the acid dye of Example 1 and 0.6 part of monosodium phosphate. The pH is adjusted to 6.0 by addition of acetic acid or disodium phosphate (whichever is necessary). The bath temperature is raised to 210° F. (99° C.) over 45 minutes and the dyeing is continued for one hour. The batch is dropped and the carpet is given a warm water rinse.

When the pH of the dyebath is adjusted to 6.5, instead of 6.0 as in the present example, similar results are obtained.

Any of the dyes of the present invention may be applied in this manner to give red to blue shades having excellent levelness and lightfastness.

In lieu of the leveling agent used in this example, others disclosed in U.S. Pat. Nos. 2,081,876 and 2,854,477, may be employed.

Wool and silk may also be dyed in fast red to blue shades by the process of this example.

EXAMPLE 39

Into an aqueous dyebath containing 4000 parts by weight of water, 1 part of the dyestuff described in Example 1, 1 part of nonionic wetting agent, 6 parts of monosodium phosphate and 0.75 parts of disodium phosphate, to maintain a pH of 6.0, 100 parts of nylon fabric are entered at 60° C. The temperature is raised to 100° C. and held at 100° C. for 1 hour while the fabric is mildly agitated to assure uniform dyeing.

The fabric is then removed from the bath, rinsed with cold water, and dried. It is dyed an even and fast shade of rubine.

The procedure of this Example can also be used to obtain useful black shades of polyamide fibers, particularly wool, silk and nylon, by including a minor portion of the dyestuff of Example 1 with major portions of a navy dye and an orange dye. Useful navy dyes for this purpose are disclosed in copending United States Application Ser. No. 768,516, filed Feb. 14, 1977 by Hans Stingl. Among the suitable orange dyes useful for this purpose are C.I. Acid Orange 116 and the orange dyes of Table II of German Offenlegungsschrift No. 2006261, Aug. 19, 1971.

The acid dye of Example 1 is shown in the form of its sodium sulfonate. It will be understood that the dyes of this invention may also be prepared and used in their free acid form or as their alkali metal or ammonium salts. For instance, in Example 1 the NaOH, NaCl, and sodium carbonate may be replaced by chemically equivalent amounts of KOH, KCl and potassium, respectively, to provide the potassium sulfonate form of the dye. Similarly, the lithium sulfonate of the dyes may be prepared.

In order to obtain the dyes in the form of their free acids an aqueous slurry of the dye is made strongly acid with hydrochloric acid and then warmed with stirring. The relatively insoluble acid form of the dye is then filtered off and washed with water.

The ammonium salts of the dyes may be obtained by dissolving their free sulfonic acids in aqueous ammonium hydroxide followed by salting out their ammonium sulfonates with ammonium chloride or ammonium sulfate.

The preceding representative examples may be varied within the scope of the present total specification disclosure, as understood and practiced by one skilled in the art, to achieve essentially the same results.

The embodiments of the invention in which an exclusive property or privilege is claimed are as follows:

What is claimed is:

1. A dyestuff of the formula

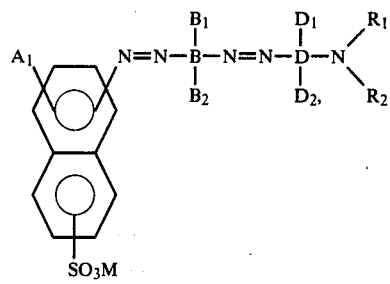

wherein

M is hydrogen, lithium, sodium, potassium or ammonium;

B and D are each independently 1,4-phenylene or 1,4-naphthylene;

$A_1$ is hydrogen, $C_{1-4}$ alkoxy, $C_{1-4}$ alkyl, trifluoromethyl, nitro, chloro, bromo, cyano or hydroxy;

$B_1$ and $B_2$ are each hydrogen, $C_{1-3}$ alkoxy, $C_{1-3}$ alkyl, chloro or bromo;

$D_1$ is hydrogen, $C_{1-4}$ alkoxy, $C_{1-4}$ alkyl or chloro;

$D_2$ is hydrogen, $C_{1-4}$ alkoxy, $C_{1-4}$ alkyl, chloro, bromo, fluoro, $C_{1-5}$ alkanoylamino, $C_{1-5}$ alkylsulfonylamino, benzoylamino, or benzenesulfonylamino, the acylamino groups either unsubstituted or substituted with 1 to 3 $C_{1-2}$ alkyl, $C_{1-2}$ alkoxy, chloro, bromo, cyano, or hydroxy; and $R_1$ and $R_2$ are each $C_{1-6}$ alkyl, $C_{1-6}$ chloro or bromoalkyl, $C_{2-6}$ hydroxy or dihydroxyalkyl, $C_{2-6}$ alkoxyalkyl, $C_{1-6}$ cyanoalkyl or phenyl-$C_{1-2}$ alkyl unsubstituted or substituted on the phenyl with 1 to 3 of $C_{1-2}$ alkyl, $C_{1-2}$ alkoxy, chloro, bromo, cyano, or hydroxy.

2. The dyestuff of claim 1, wherein B and D are each 1,4-phenylene.

3. The dyestuff of claim 2, of the structure

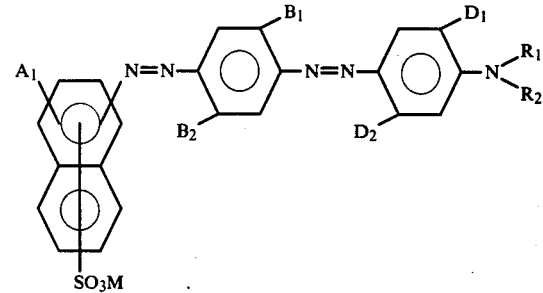

4. The dyestuff of claim 3, wherein $A_1$ is in the 2-position and is hydrogen, methyl, methoxy or ethoxy;

$B_1$ and $B_2$ are each hydrogen, methoxy, methyl or chloro, provided that only one of $B_1$ and $B_2$ is methyl or chloro;

$D_1$ is hydrogen, methyl, methoxy, or ethoxy;

$D_2$ is hydrogen, methyl, methoxy, chloro or acylamino;

$R_1$ and $R_2$ are each $C_{2-4}$ hydroxy- or dihydroxyalkyl, $C_{2-6}$ cyanoalkyl, $C_{2-4}$ alkoxyalkyl, $C_{1-4}$ alkyl or benzyl; and —$SO_3M$ is attached to the 5,6, or 7-position of the naphthalene ring.

5. The dyestuff of claim 4, wherein $D_2$ is hydrogen, methyl or methoxy.

6. The dyestuff of claim 5, wherein $B_1$ is methoxy, $B_2$ is methyl, $R_1$ is ethyl, $R_2$ is 2-hydroxyethyl, $A_1$, $D_1$ and $D_2$ are hydrogen and $SO_3M$ is $SO_3Na$ in the 6-position.

* * * * *